July 14, 1970    E. W. PLACEK    3,520,222
COMPOSITE FASTENING DEVICE
Filed Dec. 30, 1968
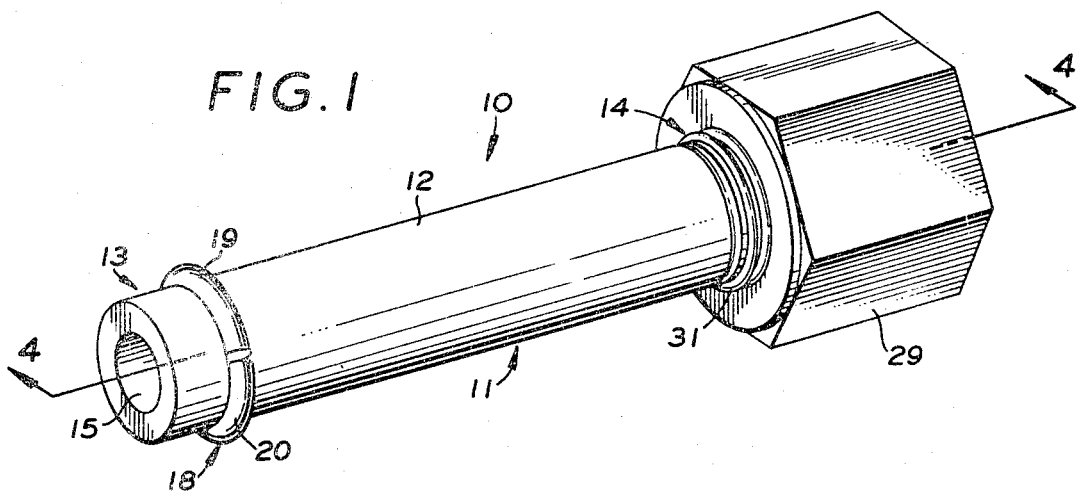
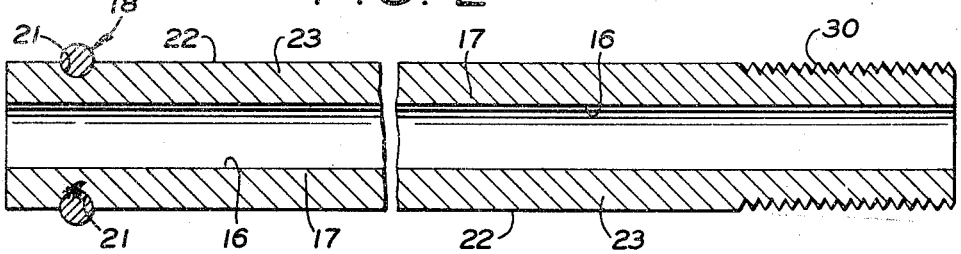
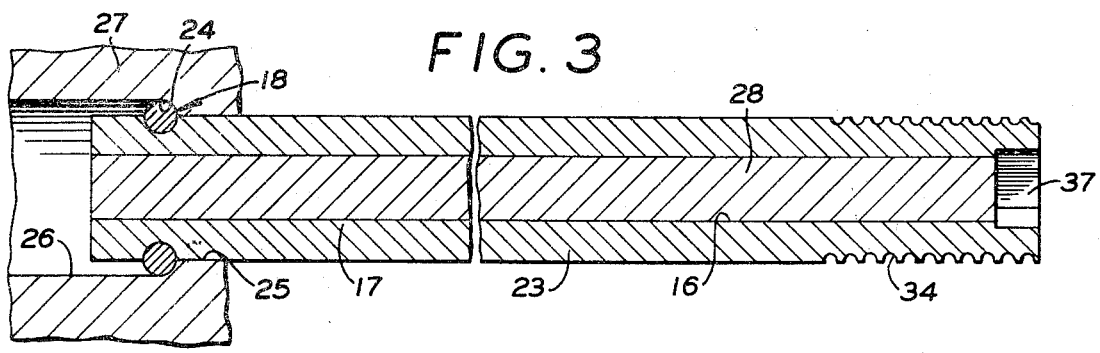
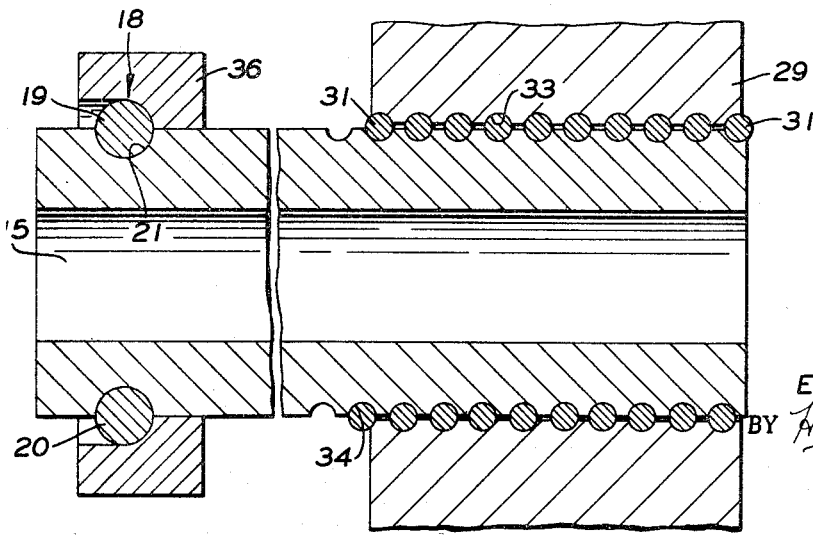
INVENTOR.
EUGENE W. PLACEK
BY Hamilton, Cook,
Renner & Kenner
ATTORNEYS

United States Patent Office 3,520,222
Patented July 14, 1970

---

3,520,222
COMPOSITE FASTENING DEVICE
Eugene W. Placek, Parma, Ohio, assignor to Allied Industries, Inc., Akron, Ohio, a corporation of Ohio
Filed Dec. 30, 1968, Ser. No. 787,705
Int. Cl. F16b *19/00, 33/02, 35/00*
U.S. Cl. 85—1                              1 Claim

ABSTRACT OF THE DISCLOSURE

A composite fastening device having enhanced strength when in shear load and comprising a shank having a head end with an annular groove therein, a retaining ring acting as a head and matingly engaging said groove; a thread end on said shank having a helical groove, said groove securing a rotatable nut.

BACKGROUND OF THE INVENTION

The present invention relates generally to a construction of a fastening device. More particularly, the invention relates to a composite fastening device having a predetermined resistance to a shear load at the head end and at the thread end of a shank.

Conventional fastening means have served for decades as a plausible device to secure objects together. However, several shortcomings, drawbacks and defects exist within the design and structure of the common mechanical entities which can be improved upon by a fastening means having composite additions to a shank.

One such drawback of a conventional fastener, such as a bolt, is the permissible shear loading which is limited by the integrity of the material in allowing laps, inclusions and discontinuities, by the variable grain flow pattern, particularly in the vicinity of large changes of mass as in the intersection of a head and body of a conventional bolt, by the non-uniform application of stress relieving processes such as heat treatment or cold working, and by the application of only tensive forces.

Conventional fasteners are also deficient in the that rotational twist loading forces exist and in that their weight and size characteristics are undesirable in air-borne applications demanding of the optimum strength/weight ratio.

SUMMARY OF THE INVENTION

It is therefore an object of the invention to provide a composite fastener having a head with improved resistance to shear forces.

Another object of the invention is to provide a composite fastener having threads with improved resistance to shear forces.

It is still another object of the invention to provide a composite fastener in which compressive loading exists.

It is still a further object of the invention to provide a composite fastener which has improved grain flow properties and improved uniformity of heat treat application and which also results in an improved material integrity.

It is still a further object of the invention to provide a hollow composite fastener which has a stress relieved interior region.

A still further object is to provide a hollow composite fastener having a filler which facilitates higher shear and deflective loadings.

It is still a further object of the invention to provide a composite fastener which has improved weight and size characteristics and which is relatively non-complex and economically produced.

It is still a further object to provide a composite fastener which has an improved reduction in twisting loading forces.

These and other objects are accomplished by the improved construction comprising the present invention, a preferred embodiment of which is shown by way of example in the accompanying drawings and described in detail herein; the invention being measured by the appended claims and not by the details of the specification.

DESCRIPTION OF THE DRAWINGS

FIG. 1 is a perspective view of an improved composite fastener according to the concept of the present invention in its assembled condition;

FIG. 2 is a section view showing a hollow composite fastener in association with standard threads and a retaining ring;

FIG. 3 is a section view showing a hollow composite fastener with a metal filler, rounded threads and the interrelation of the retaining ring with a receiver member;

FIG. 4 is a section view taken substantially along line 4—4 of FIG. 1 and showing the interrelation of the nut member, the helical ring, and the shank body and showing the retaining ring with a receiver means mounted thereon.

DESCRIPTION OF A PREFERRED EMBODIMENT

In general, referring to the drawings and particularly to FIG. 1 thereof, the composite fastener 10 comprises a shank 11 having a body portion 12, a head end 13, a thread end 14 and a hollow, bore or cavity portion 15 extending throughout the fastener.

The bore portion 15 of the shank 11 is obtained as by drilling and reaming a solid bar thereby creating bore surface 16. The surface 16, and the immediately adjacent radially outward surrounding areas or region indicated at 17, have laps, discontinuities and inclusions characteristic of any unworked piece of metal. These flaws remain in the interior part of a conventional fastener and thus reduce the permissible loading level. The present invention obviates this aspect by permitting of stress loading or densifying the inner surface 16 and the interior region 17 to a suitable depth. This may be achieved, for example, by a procedure wherein a hardened steel ball of a diameter slightly larger than the diameter of the bore 15 is forced through the bore or cavity as by hydraulic apparatus. This procedure "works," "heals," "compresses" or "loads" the metal of the surface 16 and the region 17 so as to reduce or eliminate flaws as well as the probability of stress riser propagation.

The head end 13 of the shank 11 comprises a retaining ring 18 of a sufficient thickness and type of material to sustain a predetermined shearing resistance and is composed of at least two members 19 and 20 which are generally circular in cross section. Members 19 and 20 of retaining ring 18 matingly engage a corresponding groove 21 which preferably has a semi-circular cross-section. The retaining ring 18 in lieu of a conventional out-cropping or flange type fastener head permits the manufacture of a fastener means with a vastly improved grain structure and the uniform application of heat treatment or other metal working or hardening processes. Shank 11 thus has a homogeneous and uniform grain flow in the head end 13, the body portion 12 and the thread end 14 unlike a conventional fastener and thus does not have the aforementioned flaws or abnormalities which reside in the vicinity of abrupt changes of mass such as at the intersection of the head and body portion. Furthermore, any heat treatment, metal working process or the like invariably tends to leave the intersection of the head and body of a prior art fastener relatively unaffected because of several factors, one example being its inaccessibility. In contrast, the head end 13 in the present invention can be completely treated or worked before the groove 21 is produced and the retaining ring 18 inserted. Such working may also consist of inserting the hollow fastener through a hardened ring-like object thereby stress loading or densifying the outer surface 22 and the surrounding exterior region 23 much like the hardened steel ball stress densifies the interior surface 16 and region 17.

Referring to FIG. 3, retaining ring members 19 and 20 engage shoulder 24 of a receiver means 27 which is preferably curved and which is formed between a bore 25 receiving the body 12 of the shank 11 and an enlarged counterbore 26 designed to receive approximately half of retaining ring 18. In normal operation the fastened object or receiver means 27 because of shoulder 24 will exert somewhat of a radially inward force on the retaining ring which is then imparted to the head end 13 of the shank. This compressive force is unique as a conventional fastener has no compressive loading. The compressive force further discourages the aforementioned flaws in the metal region 23 and even in the interior region 17 from developing into a shear failure in that said compressive force abates such deficiencies. The retaining ring 18 further permits shank 11 to turn as nut member 29 is initially tightened thereby greatly reducing any twisting forces and thus reducing any loosening tendencies of the shank, after the nut member 29 has been fully tightened and the shank 11 can no longer turn. In addition, retaining ring 18 may have a receiver means 36 mounted thereon as in FIG. 4 as by press fitting.

In an embodiment of the invention, bore 15 contains a high tensile filler means, preferably a metal filler 28 or a plastic filler, not shown, of a diameter slightly larger than bore 15, which is inserted preferably as by cryogenically shrinking the filler. The resulting pre-load and compressive forces will further inhibit any stress failure arising in the interior region 17 of the shank. The filler 28 thus facilitates higher fastener shear loadings and because of the radially outward force it exerts on the shank 11, particularly at the head end 13, said filler permits the fastener to tolerate much higher perpendicular forces or blows and thus facilitates higher deflective loadings. Filler 28 should preferably be of a plastic or of a light metallic material if the emphasis is upon weight reduction as an air-borne applications and if it is desirable to further reduce the weight beyond the optimum strength/weight ratio characteristics of the retaining ring 18.

The thread end 14 may be the standard type as in FIG. 2 having V-shaped threads 30 or an embodiment as in FIG. 4.

Referring to FIG. 4, the thread end 14 of this embodiment has a nut member 29, and a helical ring 31. Nut member 29 and thread end 14 have U-shaped, or semicircular shaped or sinusoidal shaped convolutions, 33 and 34 respectively, which positively engage the helical ring 31 and cannot be "cross-threaded." A force exerted on a nut member 29, when engaging a helical ring 31, will result in application of a radially inward forces, or compressive forces, upon the thread end 14. The advantage of compressive loading on the thread end 14 as with the compressive head loading of the head end 13 is the abatement of shear failures because of the additional stress loading forces being applied to the outer exterior portion 23 of the thread end 14. The helical ring 31 in making possible the application of compressive loading to the thread end 14 thus reduces the possibility of pitch diameter shear as is encountered with conventional threads where no compressive forces exist.

In another embodiment, see FIG. 3, the thread end 14 has an additional provision to limit the rotation of the shank 11 relative to receiver means 27. A recess 37 such as a hexagonal type fitting is provided so that a conventional engaging means, not shown, which engages a non-rotatable means prohibits rotation of the composite fastener.

It can be seen that the disclosed device carries out the objects of the invention set forth above. Since various modifications in details, material and arrangements of parts are within the spirit of the invention herein disclosed and described, the scope of the invention should be limited solely by the scope of the attached claims.

I claim:

1. A composite device for the fastening of objects together, comprising a shank with a head end and a thread end and having a bore extending axially therethrough, said head end having an annular groove, said thread end having a helical groove and said bore containing a high tensile filler means of a diameter initially slightly larger than the diameter or said bore, a retaining ring in said annular groove, said retaining ring having a predetermined resistance to shear load applied to said shank, said retaining ring being received within one of said objects and said helical groove securing a rotatable nut.

References Cited
UNITED STATES PATENTS

| | | | |
|---|---|---|---|
| 1,813,790 | 7/1931 | Wildish. | |
| 2,089,784 | 8/1937 | Cornell | 285—422 X |
| 2,440,452 | 4/1948 | Smith. | |
| 3,044,584 | 7/1962 | Thompson | 85—1 X |
| 3,062,568 | 11/1962 | Andreson et al. | 85—46 X |

RAMON S. BRITTS, Primary Examiner

U.S. Cl. X.R.

86—9, 46